(12) United States Patent
Sklar

(10) Patent No.: US 6,243,094 B1
(45) Date of Patent: *Jun. 5, 2001

(54) CLUSTERING USER INTERFACE

(75) Inventor: Peter Sklar, 837 Cheltenham, Santa Barbara, CA (US) 93105

(73) Assignee: Peter Sklar, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,172

(22) Filed: Oct. 11, 1999

Related U.S. Application Data

(63) Continuation of application No. 08/861,365, filed on May 21, 1997, now Pat. No. 6,025,843, which is a continuation-in-part of application No. 08/711,300, filed on Sep. 6, 1996, now Pat. No. 5,790,121.

(51) Int. Cl.[7] ...................................................... G06F 17/30
(52) U.S. Cl. ............................ 345/356; 345/333; 345/352
(58) Field of Search .................................... 345/331, 333, 345/334, 335, 344, 345, 346, 353, 356

(56) References Cited

U.S. PATENT DOCUMENTS

| | | |
|---|---|---|
| 5,544,352 | 8/1996 | Egger . |
| 5,790,121 * | 12/1998 | Sklar ...................................... 345/356 |
| 5,838,317 * | 11/1998 | Bolnick et al. ....................... 345/349 |
| 5,848,399 * | 12/1998 | Burke .................................... 705/27 |

* cited by examiner

Primary Examiner—Raymond J. Bayerl
Assistant Examiner—Cao H. Nguyen
(74) Attorney, Agent, or Firm—Philip H. Albert; Townsend and Townsend and Crew LLP

(57) ABSTRACT

A user is presented with a display of item labels and category labels, where item labels are shown to the extent that categories contain not more than a threshold count of items. Alternatively, the item labels are shown to the extent that display area is left over after the display of category labels, and the categories for which item labels are shown are selected from the smallest categories to the largest.

27 Claims, 11 Drawing Sheets

CLUSTERING USER INTERFACE

CROSS REFERENCE TO RELATED APPLICATIONS

This application is a continuation application of U.S. patent application Ser. No. 08/861,365, filed on May 21, 1997, now U.S. Pat. No. 6,025,843, which is a continuation-in-part application of U.S. patent application Ser. No. 08/711,300, filed on Sept. 6, 1996, now issued U.S. Pat. No. 5,790,121.

BACKGROUND OF THE INVENTION

This invention relates to computer database searches. More precisely, this invention provides an improved interface for performing computer database searches and filtering search results.

In the typical database search, a user queries the database by selecting a set of criteria (a request) and submitting those criteria to a database engine. The criteria might be in the form of a range of allowable values for a given field, an upper limit, a lower limit, or an exact match. Multiple field criteria can be combined by the use of logical operators (e.g., NOT, AND, OR, GREATER_THAN). The criteria might also include comparisons between multiple fields (e.g., AGE>=IQ). Once the criteria are submitted to the database engine, the database engine selects all the records in the database that meet all of the criteria selected by the user and returns those records to the user.

Many different methods have been utilized to facilitate the user's creation of database requests. One standard for specifying database search criteria to the database engine is Structured Query Language (SQL). SQL statements are strings of text and numbers which define the search request. If the end user requesting data from a database is proficient in SQL, the end user can specify the SQL statement directly. However, where the end user is not proficient in SQL programming, a user interface might be provided to allow the end user to intuitively select elements from the user interface, which are then converted into SQL statements for submission to an SQL-capable database engine. Many user interfaces which convert user input into SQL statements are known. In some interfaces, a user answers a series of questions, fills out an on-screen form or selects from a finite number of choices using a mouse or other pointing device.

Once such search request is submitted, the database engine returns the records meeting the criteria, if any, and the user interface displays the records or some indication of the records. Several methods have been used to display the data returned from the database query, such as tables, charts, graphs, and graphic images such as maps or tree structures. The term "maps" as used herein can be geographical maps or logical maps laying out data points in an N-dimensional coordinate system.

It is also known to allow for refinement of a database search after the results of an initial search have been obtained. A refinement search is often desired by users where the initial search produces too many or too few records. With a refinement search, users might edit the initial search request or add additional criteria to the initial search request. By doing so, users can find the proper quantity and quality of records they need.

An important factor in determining a proper search criteria is prior knowledge of the database and the distribution of the values in each field. For example, the user knows that the database contains only a listing of Democrats, a search for male Republicans over the age of fifty living in cities of at least one million people will turn up no records. The user might then waste time refining the search by first eliminating any limitation on the size of the city, then eliminating the age limitation, eventually to discover that there are no Republicans in the database. The opposite result, too many records, could occur if the user specified too general a set of search criteria. In that case, the user might also waste time iteratively narrowing the search with little effect. Often, the success of a database search is dependent upon luck.

Another shortcoming of most current search methodologies is that users do not gain any knowledge during the search process to help refine their search. In some systems, database records, especially geographical databases, present records to the user as a set of dots overlaid on a map. While such an interface might be useful for a few dots, it becomes impractical for use with a large number of dots.

With large numbers of dots, either the dots will be too small to be selected with a pointing device or, if large enough, the dots will obscure other dots. FIG. 1 illustrates the former problem; FIG. 2 illustrates the latter.

One way to avoid the selection problem is to allow the user to click the pointing device near the point of interest and treat the click as the selection of all points within a radius ("a radius search"). Of course, this has the disadvantage of selecting too many records, too few records or the wrong records.

Another way to avoid the selection problem is to have a user select on arbitrary boundaries such as state boundaries, and gets a text listing of all the locations in that state, and possibly a further graphical selection of a county or region. The state selection is shown in FIG. 3. The disadvantage of this approach is that the user, at most, knows only whether or not a state contains at least one dot.

In addition to geographical data and other data which can be plotted in a two-dimensional plane (or an N-dimensional coordinate system with N being an integer greater than zero), data in searchable hierarchical structures often need to be searched.

One way to present the data points in a hierarchical structure search is to present all the data points. However, with large numbers of data points, this is impractical.

For example, Microsoft Word™ word processing software provides a feature for searching for files among the hierarchical directory structure of a disk. The matching files are displayed in a directory tree structure showing each of the directors for the files along with their parent directories. While this is useful for a small number of files, the display for a large number of files would not fit on the screen and thus the user must scroll through the listing or manually "collapse" uninteresting directory structures to be able to see the directory structures of interest. This approach does not give the user a "big picture" view of file structures, unless the user knows what the big picture looks like and creates it for themselves.

Yet another shortcoming of prior art information displays appears when there are more items to be listed than can fit on a display. One solution is to list all the items on a scrollable list. The other is to group the items into categories and display categories first, allow the user to select one of the categories, then display the items matching the selected category. Neither of these approaches is entirely satisfactory, however. In the former case, too much data and not enough information is presented. In the latter case, depending on the categories, the display might be underused.

Therefore, what is needed is an improved search interface which presents the user with information and views of the overall data being searched, in order to allow for an informed search.

SUMMARY OF THE INVENTION

In one embodiment of a search interface according to the present invention, a user is presented with a display map from which the user selects database records of interest. For the records which are in range of the display map's limits, a cluster evaluator groups some of the records into clusters. Generally, a cluster is a set of records which would be clustered on the display map. On the display map, unclustered records are represented by item icons, while clusters are represented Iy cluster icons. If a user selects an item icon, the associated record is selected and a predetermined action is taken. If a cluster icon is selected, the display map is "zoomed in" to show greater detail around the cluster. Typically, a number of clustered records become unclustered records when the zooming occurs, because the clustering criteria are sharpened. The user can iteratively select clusters, resulting in greater and greater detail, until the user selects an item icon and the predetermined action is taken with that record. The predetermined action could be any action which might be taken with an individual record, such as displaying additional fields for the record, initiating a process for manipulating the record, or the like.

The term "icon," as used herein, refers to a user interface element which is presented to the user and is selectable by the user using a pointing device. Depending on context, icons can be regular shapes or irregular shapes, can have identified borders or implied borders, and can either be illustrated with a graphic that hints to the meaning of the icon or can be a plain area whose meaning is identified by context.

The records are mapped to the display based on field values of the record. For example, a two-dimensional map could be used to display records which contain longitude and latitude values. The same principles could be used for one-dimensional data, three-dimensional data, or higher dimensional data which can be suitably represented on a two- or three-dimensional display. If the search data is numerical data from as many fields as the display has dimensions, cluster icons are graphically displayed as shaded regions on a graph or map, roughly coextensive with the mappings of the records to the display. Unclustered records are graphically represented by item icons at the location corresponding to the field data of the records. Thus, a user can easily see where the clusters are, where the unclustered records are, and regions where no records exist. Clusters might overlap, so that one record is clustered into more than one cluster. By selecting a particular cluster, the user reduces the dataset to a subset which contains only those records which were clustered into the selected cluster. The new subset is then clustered to allow the users to narrow their search further, and the selection process to begin again. The users can end their search at any time, but eventually, the dataset will be reduced to a set of records that do not cluster.

The present invention can also be used to present hierarchical structures for user selection of records from such structures. Examples of such hierarchical structures include electronic file storage directory structures, organizational charts within large organizations, plain hypertext pages on a Web site, or an intranet. In such cases, clustering is done by using a metric which is the number of links rather than a distance in a coordinate system or a weighted metric which takes into account hierarchies where some links are more important than others, such as taxonomy hierarchy. For example, two files in the same directory would be deemed to have a metric between them of 0 and a file in a parent directory would have a metric between a file in an immediate subdirectory of 1. For files which are "cousins," the metric could either be the number of links in the shortest path between the two files (2) or the number of links to a common ancestor (1). Such a clustering process might prove to be highly useful in sorting through corporate data, if it is clustered and organized according to an organizational chart, wherein information provided by departments nearer to the user's department is given more prominence than information from departments which are "farther" away on the organization chart. Presentation of hierarchical information would also be greatly simplified using the present invention, as many search engines or searching Worldwide Web sites tend to either show too many hits or too few hits. For example, a large URL (uniform resource locator) database such as YAHOO!'s database would provide too many references matching the word "team" to be of use to a searcher. However, with the clustering user interface of the present invention and a starting point, such as the "Oakland Raiders" subcategory of Yahoo!'s hierarchical subject database, the user could be, presented with all the hits, where many of the hits are clustered into a single entry. The user would be provided with a cluster icon to "open" that cluster, possibly leading to other clusters. Instead of a URL database, the invention could also be applied to a "yellow pages" database.

In order to achieve a manageable number of clusters the clustering algorithm can incrementally increase the minimum distance separating two clusters. As the distance increases, the number of clusters will decrease. When the total number of clusters becomes less than a predetermined threshold, that distance is used in the clustering algorithm. An alternative method for incremental clustering would be to initially create clusters of records that are separated by very small distances and then gradually combine these clusters into bigger clusters until the total number of clusters becomes less than the threshold. In order to prevent creating too few clusters, the clustering process can be modified to terminate before all cluster pair distances are calculated. For instance, if a current step of clustering is combining all clusters less than five miles apart, the clustering process could terminate when the goal of getting the total number of clusters of less than twenty has been achieved even though there are still clusters less than five miles apart remaining.

In yet another application of clustering, a list of categorized items are displayed as a list of labels, where a label is a textual and/or graphical indication of what the label represents. Each label represents either an item or a category, where an item label represents an individual item, while a category label represents an entire category of items. A display manager determines which items are shown individually and which are grouped by category so that the full display is used. One method of filling a display is to set a threshold count and to tag for individual display all items in categories having no more than the threshold count of items and to tag for category display the items in categories having more than the threshold count of items. The threshold count is then adjusted so that the labels just fill the display. Thus, if there are too many labels, the threshold count is raised, and if there are too few labels, the threshold count is lowered, until the threshold count reaches one, at which point the display will show all of the items with item labels.

A further understanding of the nature and advantages of the inventions herein may be realized by reference to the remaining portions of the specification and the attached drawings.

DESCRIPTION OF THE PREFERRED EMBODIMENTS

The present invention can operate on a wide variety of computers with a number of suitable configurations, each being the preferred embodiment for a particular implementation. For example, a palmtop implementation might be preferred for use with a restaurant finding device designed to be used by a person walking around looking for a good restaurant meeting the person's criteria. A desktop model, with high resolution graphics and a direct Internet connection might be preferred for an office-based application- This detailed description of the invention will describe an embodiment using a desktop computer and an embodiment using the Internet (the global internetwork of networks generally referred to by that name), although it should be understood that many other configurations of computing devices might also be used to provide similar functionality. For example, the user might be an Internet or Intranet surfer, a system administrator, an email administrator or an interactive television viewer/user. The computing device might also be a mainframe terminal or computer kiosk.

Figure 4:
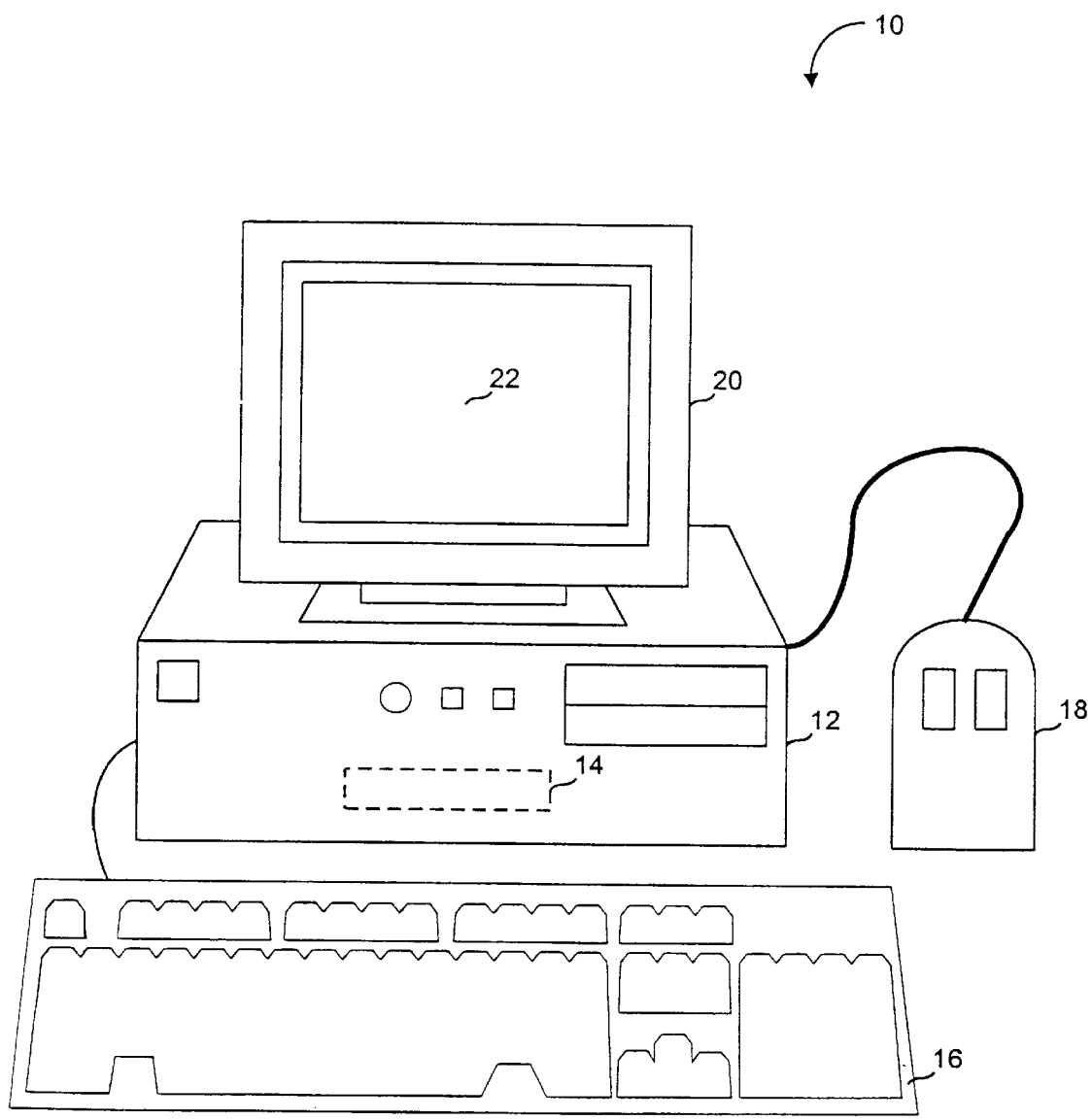
FIG. 4 is a front view of a computer system which could be used to implement the present invention.

FIG. 4 shows a typical desktop computer 10 made up of a system box 12 enclosing a hard disk 14, a keyboard 16, a mouse 18, and a monitor 20 including a display surface 22. As is well known in the art, desktop computer 10 can be programmed with programs stored on hard disk 14 to perform various tasks. These tasks might involve accepting user input from keyboard 16 and mouse 18, and/or displaying images or text on display surface 22. The input from mouse 18 is in the form of either movement in two dimensions (rolling the mouse) or clicking (pressing one of the mouse buttons). It is also well known to replace mouse 18 with equivalent two-dimensional pointing devices, or even three-dimensional pointing devices. With suitable software or hardware, monitor 20 can be made to display three-dimensional images, as is well known in the graphic arts.

Figure 5:
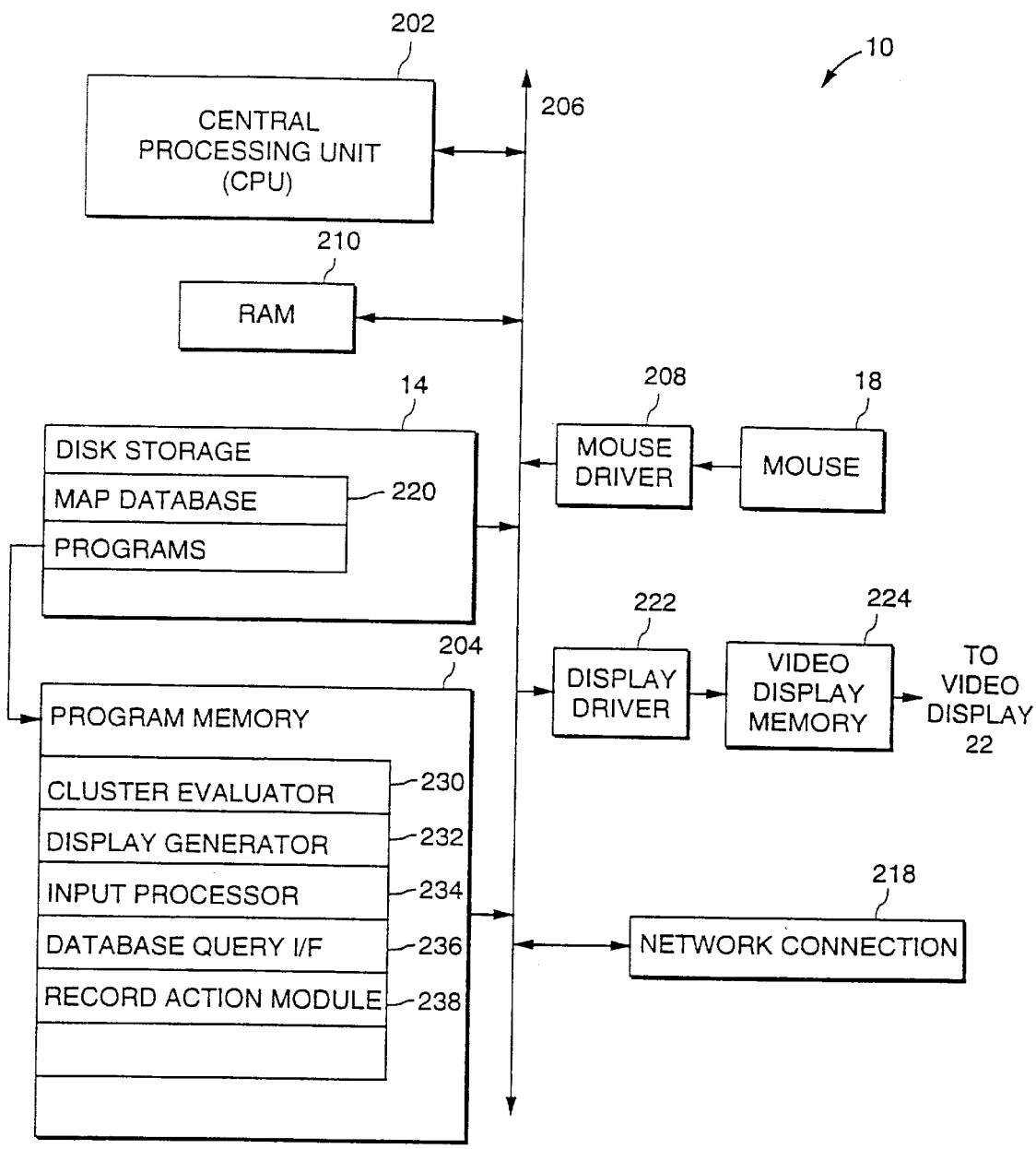
FIG. 5 is a block diagram of the components of the computer system shown in FIG. 4 as they relate to the present invention.

FIG. 5 is a block diagram illustrating the typical contents of system box 12 in more detail. A central processing unit (CPU) 202 executes programs stored in a program memory 204 by reading program instructions from program memory 204 via processor bus 206. Of course, multiple CPU's could be provided for faster operation in some computer systems. CPU 202 interprets input signals from mouse 18 provided on bus 206 after being suitably transformed by a mouse driver 208 which might be hardware, software, or a combination of both. CPU 202 uses a RAM (random access memory) 210 for storage of program variables as needed. Bus 206 also provides a path for CPU 202 to send output signals to display surface 22 of monitor 20 (see FIG. 4) via a display driver 222 and video display memory 224. If used, desktop computer 10 can communicate over a network with a network connection 218.

To program desktop computer 10 according to the present invention, hard disk 14 is loaded with a map database 220 and one or more programs. To begin executing a program which implements the present invention, CPU 202 causes the program to be loaded from hard disk 14 into program memory 204. In a typical personal desktop computer, program memory 204 and RAM 210 are different segments of one memory structure. As shown in FIG. 5, the program includes a cluster evaluator 230, a display generator 232, an input processor 234, a database query interface 236 and a record action module 238. Other components, such as a database engine, are included but not shown in FIG. 5.

Using the system described in FIGS. 4–5, a user will select records from map database 220 and have a selected record acted on by record action module 238. A process of using the system according to the present invention is described in more detail in connection with FIGS. 6–7. First, two examples of the prior art will be described. In both the prior art and the presently described inventive embodiment are user interfaces in which the user's goal is to select a record according to geographical location. One use of such a system is to allow users to select one store of a national chain of stores and perform an action with respect to that store (e.g., dial that store's telephone number, get a map of surface streets giving directions to the store, get listings of hours of operation, products carried, manager name, etc.).

Figure 1:
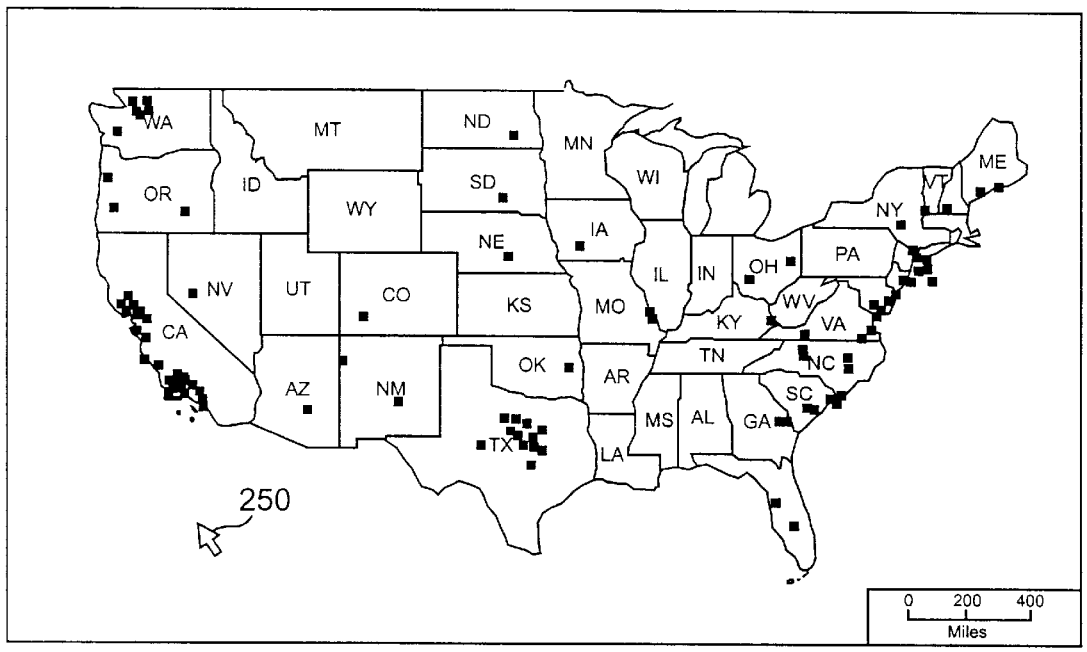
FIG. 1 is a clickable map with small squares on the map representing individual records in a database of records where each record has a location within the map of the continental United States.

FIG. 1 shows one method of record selection known in the prior art. Each of the small black squares on the map represents one store. To select a store, the user positions a mouse cursor 250 over the desired one of the black squares and clicks a mouse button to select the store. While that may be useful in areas where there are few stores, such as Colorado and Oklahoma, it would be very difficult for the user to position the mouse exactly to select the desired store if it were in California, Washington, Texas or the East Coast. The selection difficulty increases if the display uses, instead of small black squares, icons displaying the company's logo.

Figure 2:
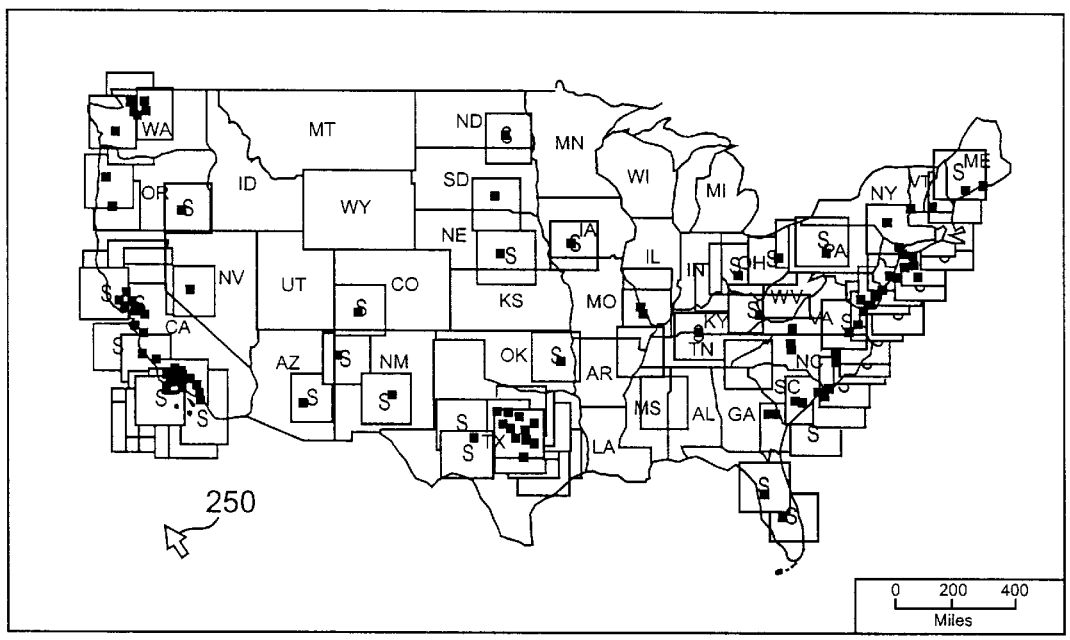
FIG. 2 is a clickable map with large squares as used in the prior art.

FIG. 2 shows what a user interface might look like is if icons displaying a company's logo were to be presented in each dot. As FIG. 2 shows, the logo icons would be completely unwieldy even with only a few locations.

Figure 3:
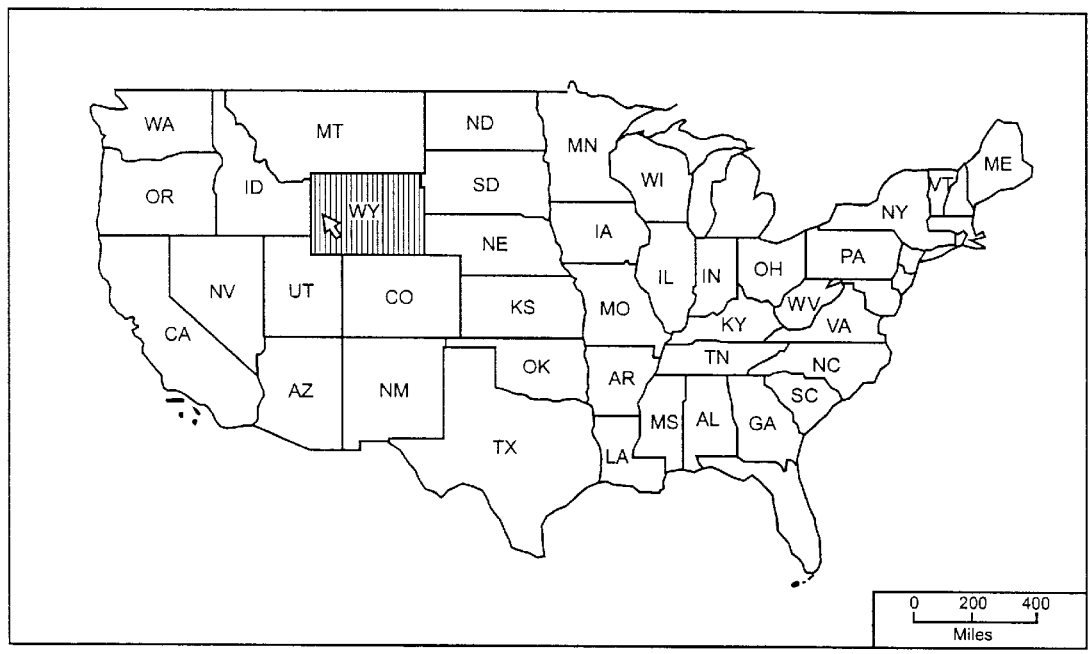
FIG. 3 is a clickable map where a state of interest is selected.

FIG. 3 shows one way to avoid the problems illustrated in FIGS. 1–2. Instead of the user having to select one store from all the national stores, the user instead selects the state of interest. In FIG. 3, the user has positioned the cursor and selected the state of Wyoming. In response, the computer would show an expanded, zoom display of the state of Wyoming. As could have been seen from FIG. 1 or FIG. 2, the selection of Wyoming is fruitless because there are no stores in Wyoming. On the other hand, the user might have selected California, which does have many stores. However, the computer might need to zoom in one more level if too many stores are represented in the state view.

Figure 6:
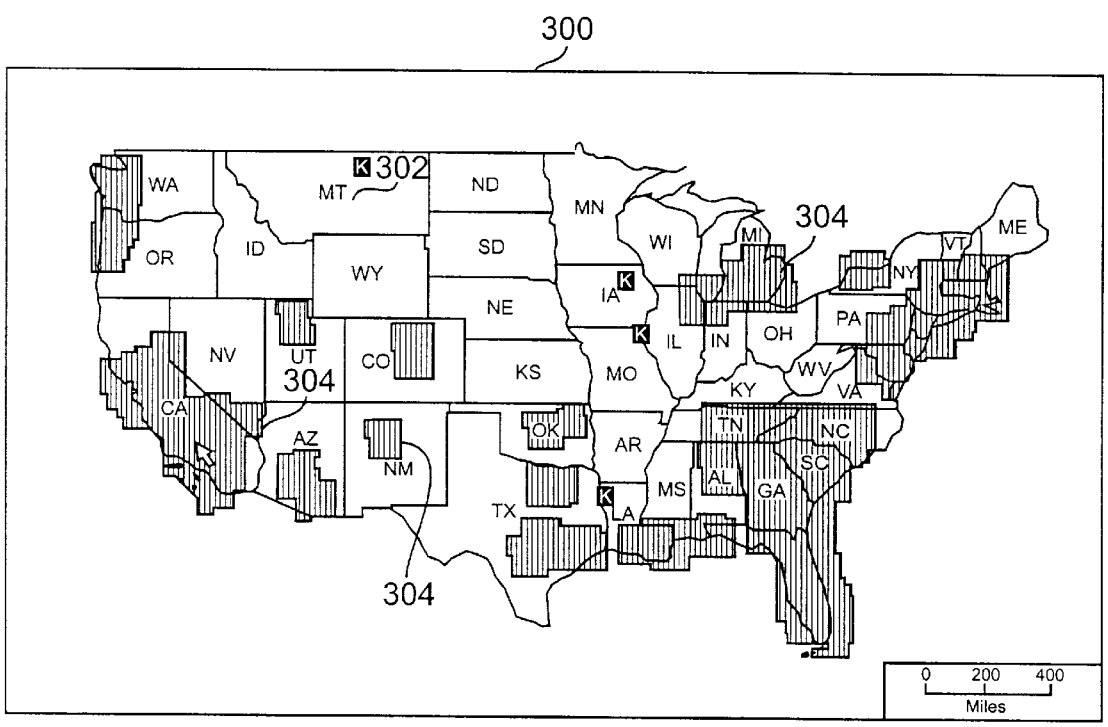
FIG. 6 is a clickable map according to the present invention with unclustered item icons and cluster icons are overlaid on a map.

FIG. 6 shows an improved display 300 according to the present invention. Overlaid on a map of the contiguous United States, display 300 includes item icons 302 and cluster icons 304. Item icons 302 represent the locations of individual stores which are not clustered with other stores as determined by cluster evaluator 230. Using mouse cursor 310, the user can select either a cluster icon 304 or an item icon 302. If the user selects an item icon 302, the computer responds with the predetermined item action. If the user selects a cluster icon, such as the one shown under mouse cursor 310, the computer zooms in to the map shown in FIG. 7. As should be apparent from FIG. 6, the user can easily identify where there are no stores and where there are collections of stores. Note that the data and the cluster icons are not necessarily constrained by state or other boundaries. The shape of the cluster icons are determined by the locations of their constituent items, as explained below.

Figure 7:
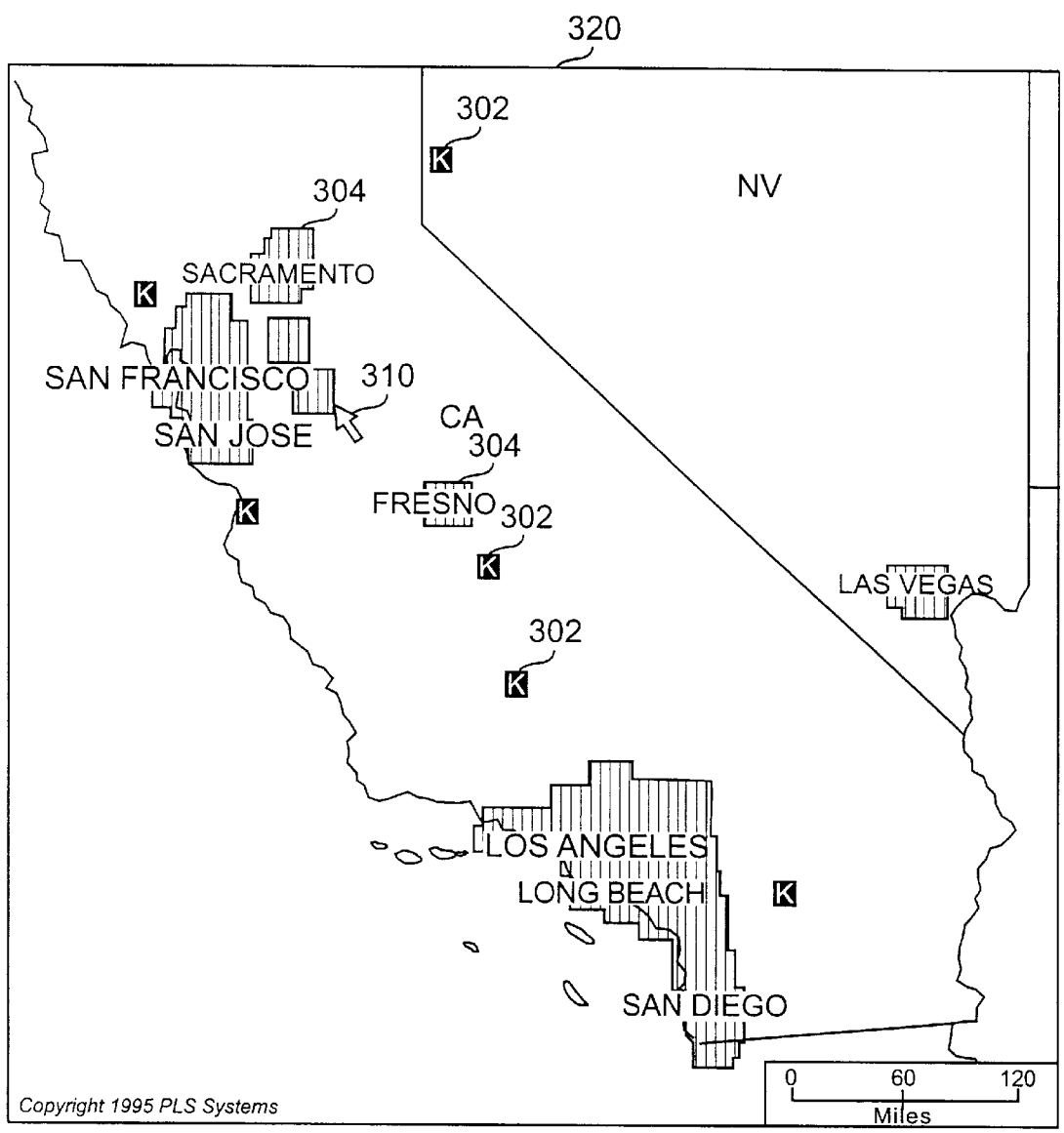
FIG. 7 is a clickable map which results from user selection in FIG. 6 of the cluster under the mouse cursor.

Referring now to FIG. 7, the zoomed in map 320 now shows several individual stores in a second layer of clusters. The process of zooming continues until the user aborts or selects an item icon. Note that, in FIGS. 6–7, the individual icons can be large enough to show the company's logo ("K" for the imaginary sunglass retailer "Kool Shades" used for this example) without interfering with the selection process.

Figure 8:
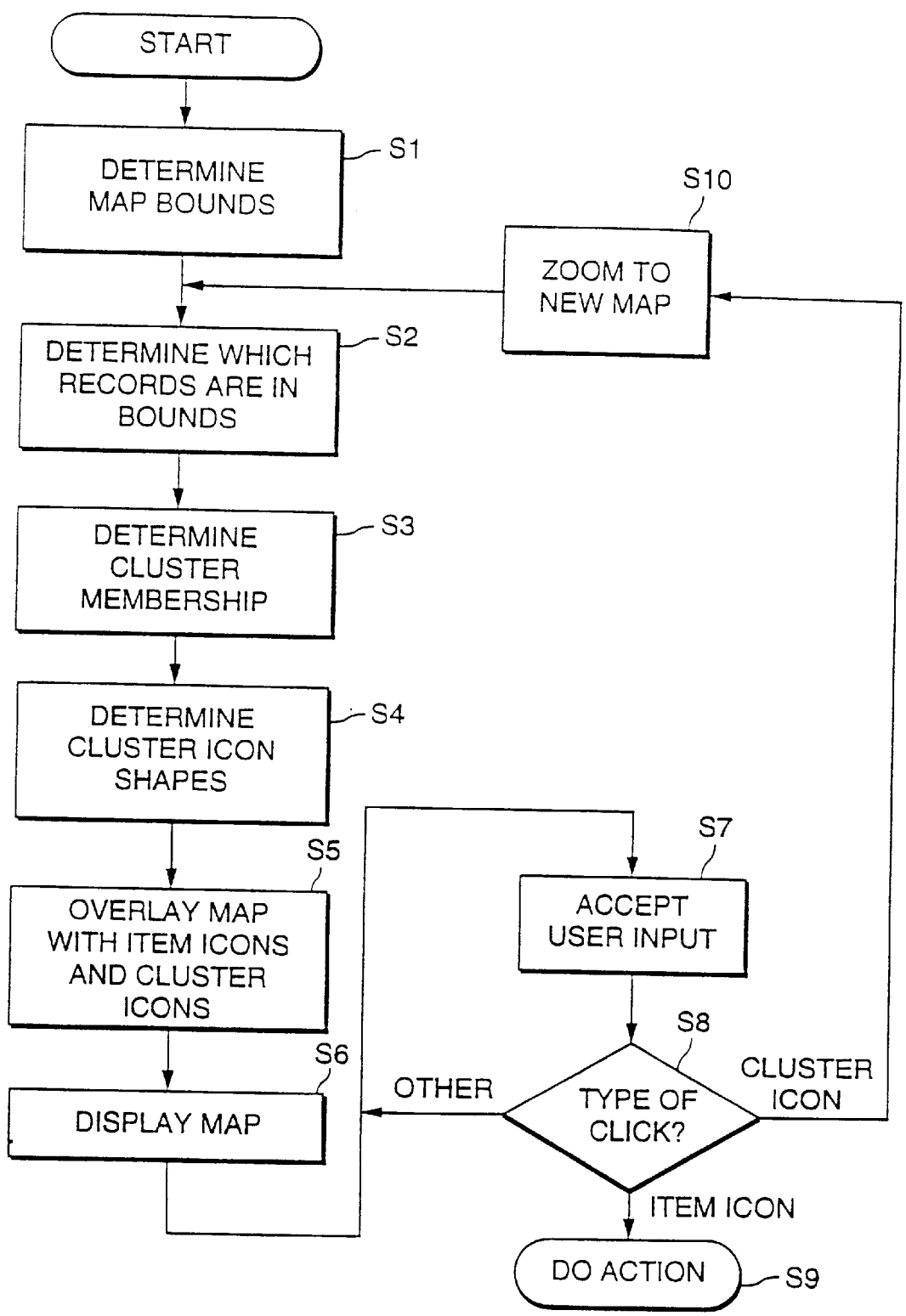
FIG. 8 is a flowchart of a display process according to the present invention.

The display maps shown in FIGS. 6–7 are generated by computer system 10 according to the process shown in the flowchart of FIG. 8. That flowchart includes a series of steps numbered in ascending order which are executed in that order except where indicated. In the first step (S1), the computer determines the map bounds. For a national chain such as Kool Shades, the default initial map bounds are defined by the rectangle enclosing the contiguous United States. In step S2, the computer determines which records are within the map bounds. These are the records the user can select among.

Of the selectable records, cluster membership is determined (S3). Each cluster has a set of records which are its members. In the illustrations provided here, each record is either a member of no cluster or a member of one cluster. However, the system could be designed to allow a record to be in more than one cluster, so long as each cluster contains a subset of records significantly smaller in size than the set of all records. Many of the different clustering algorithms in different fields of math and science will function adequately for this purpose, depending on the goals of the search and type of data. Other clustering factors, such as the metric used and the normalization of metrics, play important roles in the search process.

One method for clustering uses a geographic distance metric. Each record for a Kool Shades store includes the longitude and latitude of the store. Using this information, the geographic distance between two stores is easily calculated using known techniques.

With other types of data, a metric can be generated from the values for the data. For example, if the user were selecting records not based on a geographic location, but based on the records' "locations" on a plot of two field values, those field values might need to be normalized. One way to normalize the values is to scale each axis of the plot so that the values fall within a square. This is equivalent, for a first field and a second field, to dividing each first field value by the range of first field values and dividing each second field value by the range of second field values.

Although not required for distance calculations, the values can be transformed so that all normalized values fall between zero and one. Thus, a new value, V', for a field value can be calculated from the original field value, V, with the formula:

$$i\ V'=K(V-L)/(H-L)$$

where L is the lowest field value and H is the highest field value. The multiplicative constant K is set to one to keep all values in the range from zero to one, but it could be set to any other suitable value.

In any case, not only can a position in the two-dimensional display space can be found for any record, the "distance" between any two records can be found. These distances are used to determine which records cluster with which other records. One method for clustering data is to consider each record as an N-dimensional sphere (a circle in the case of Kool Shades stores). Any records whose spheres intersect would be clustered together. The radius of the spheres may depend on the needs of the application, the total number of records, the distance between map boundaries and the density of records in particular locations.

In the case of exclusive clustering (each record is a member of at most one cluster), the following pseudocode describes the process of assigning records to clusters:

Main Program: Find All Clusters
    Begin Loop (for each Record)
        If Record is Unclustered then Begin
            Create New Cluster
            Add_Record(Record, New_Cluster)
        End If Then
    End Loop
End Program
Procedure Add_Record(Record, Cluster)
    Put Record in Cluster
    Begin Loop (for each Unclustered Record)
        If(Distance(Record, Unclustered Record)<Threshold)
            then Add_Record(Unclustered Record, Cluster)
    End Loop
End Procedure The result of this process is that each unclustered record will be assigned to one cluster and any record which is within a sphere radius of a clustered record will be a member of that cluster. As should be apparent, the size of the cluster is often dependent on the distribution of its members. In the above program implementation, all records are assigned to clusters, with the unclustered records each being the sole member of their cluster. Although, technically, they may be assigned to such solo clusters, they are considered to be unclustered.

Once the clusters and unclustered records are determined, the cluster icon shapes are calculated (S4). Of course, if the data is not graphically displayable, this step need not be done. A cluster icon can just be a shaded area covering the union of the circles for each record in the cluster. An algorithmically easier method for determining shape is to consider each record as a square or a cube. The shape of the cluster is then derived by using polygons to outline the shape of the union of the squares or cubes.

In step S5, the map is overlaid with cluster icons and item icons. In step S6, the map and overlays are displayed to the user. As explained above, the user can easily see where unclustered records are, where clusters are, the clusters' extents and the areas where no records are to be found.

In step S7, user input is accepted and in step S8, the type of user input is evaluated. If the user clicks on the map outside an item icon or a cluster icon, the program flow is from step S8 back to S7 (i.e., no action is performed). If the user selects an item icon, the predetermined action for items is performed (S9), be it displaying a street map with directions to the individual store or other data about that individual record. If the user selects a cluster icon, the program proceeds to step S10, where a new, zoomed map is generated. Once the new map is generated, the program loops back to step S2 to generate a new set of included records and the program repeats steps S2 through S8. Where applicable, the predetermined action could be a display of the record in detail showing all field values, presenting an editing screen for updating the record, initiating a phone call or an e-mail message to a place or person referred to in the record, or anything else that could be done with just one record.

A concrete example is presented here for further explanation of the process. Suppose data fields to be clustered were latitude and longitude and the cluster icons and item icons were to be displayed on a 400×400 pixel map of the contiguous United States. A radius of 8 pixels could then be used to cluster 1000 records scattered over a map of the United States. Since the scale on the U.S. map is roughly 10 miles/pixel, records within 80 miles of each other would be clustered (i.e., the initial cluster threshold would be 80 miles). If the user selects a cluster and the zoomed in map has a resolution of roughly 2 miles/pixel, records within 16 miles of each other will then be clustered. The result of the larger scale is that more locations are separated and more sub-clusters are created. Of course, with dynamic thresholding, the threshold distance is adjusted to obtain a suitable number of clusters.

Figure 9:
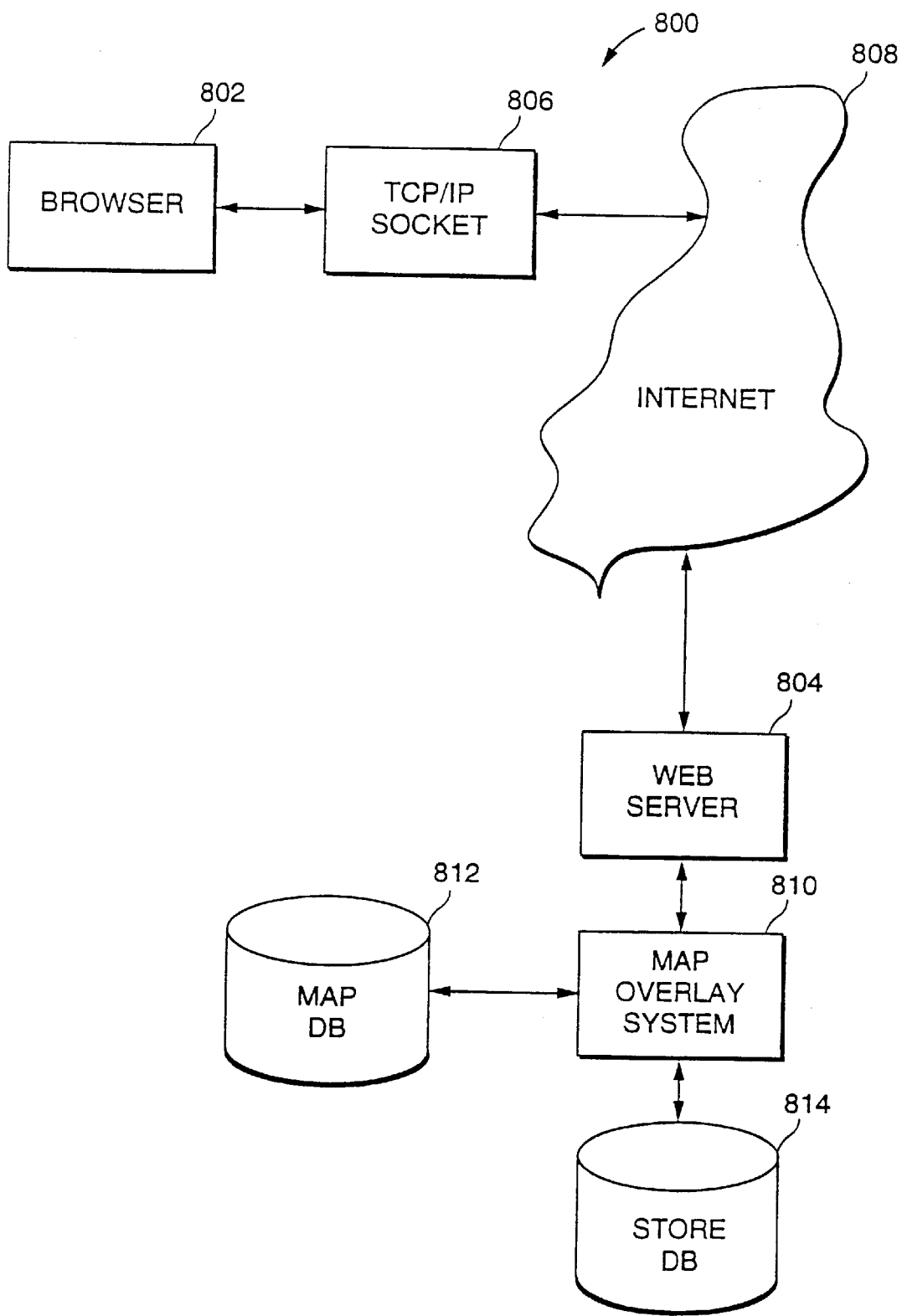
FIG. 9 is a block diagram of a networked system over which the present invention could be used.

The basic embodiment of the invention having been described, two variations will now be described. FIG. 9 is a block diagram of an embodiment of a mapping system 800 using an Internet connection. In mapping system 800, a Web browser 802 is used by the user to interact with a Web server 804 via a TCP/IP interface 806 and the Internet 808. Web server 804 provides maps overlaid with icons to Web browser 802, which displays the maps and allows the user to click on points on that map. Web browser 802 returns to Web server 804 and mouse clicks which Web server 804 would need to have to generate a new map. Web server 804 obtains the overlaid maps from a map overlay system 810 which operates substantially as described above, using a map database 812 to obtain maps and store database 814 to obtain records about the location of stores. Of course, the records mapped need not be store records.

Initially, map overlay system 810 will request the initial map from map database 812. Typically, map database 812 is a data structure containing map data, but also includes an engine interface whereby map overlay system 810 requests maps by specifying a scale and the four edges of the desired map. As the user selects points on the map, map overlay system 810 will generate new maps according to the process described in connection with FIG. 8.

Mapping system 800 is useful where the user does not control the map data or the store data. It also allows for easy updating of store locations and other data in store database 814 because it is centralized. Mapping system 800 could also be attached to a company's Web site is such as way that the store location function appears to be part of the company's Web site, but is actually served by a map service provider. This allows for easy updates of map serving software and the underlying maps, since all of that is in one place.

Figure 10:
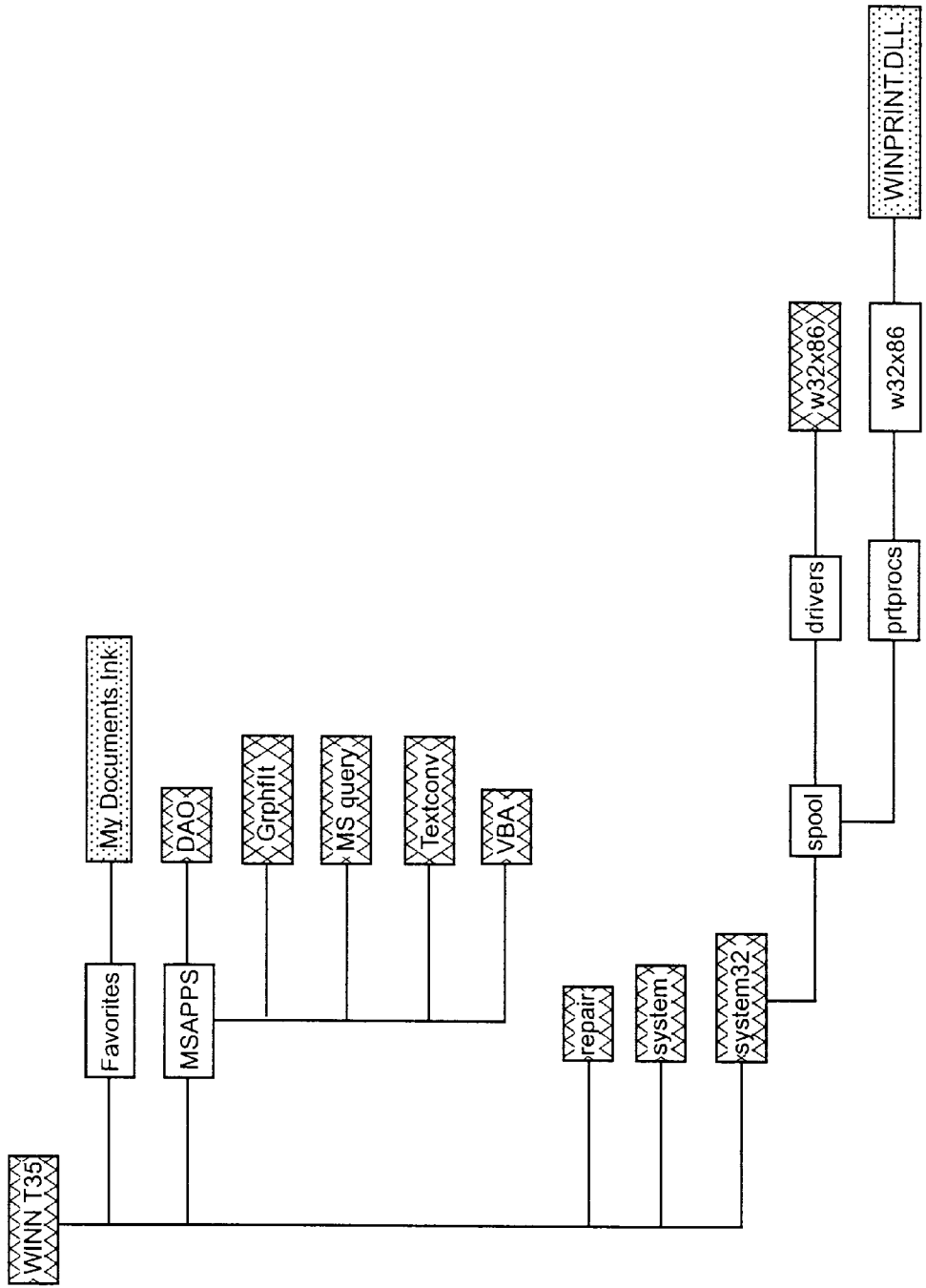
FIG. 10 is a map of a directory structure which can be searched using the present invention.

In situations where the clusters and individual records cannot be displayed in a graph or map, the representation of the clusters can be performed by providing the user with summary statistics and summary graphs of the fields and/or combination of fields in each cluster. The user would use this summary information to select his/her desired cluster or record. One such example is shown in FIG. 10, where a file directory structure to be navigated is laid out. Analogous to the location maps, distances between files can be determined, so they can be clustered. The distance between two files might be the number of links to be traversed from one file to the other, or the number of links from a common ancestor of both files to the file furthest from the common ancestor.

FIG. 10 shows a selection display for a hierarchical directory structure. The labels shown with cross-hatching are cluster icons for the hierarchical directory list and item icons are shown with gray labels. For example, the cross-hatched label "repair" refers to a directory of that name which contains files meting the search criteria. The file "WINPRINT.DLL" is an individual file meting the search criteria. If the user selects one of the cluster items, a new and expanded display is presented showing the files and clusters underneath the selected subdirectory in more detail. FIG. 10 shows twelve icons, which are either cluster icons or item icons. As each display is generated, the substitution of a cluster icon for a plurality of individual item icons is performed until sufficiently few individual icons remain. Of course, in some cases, such as a single directory having hundreds of files meting the search criteria cannot be effectively clustered using just a file's subdirectory as the cluster parameter.

Figure 11:
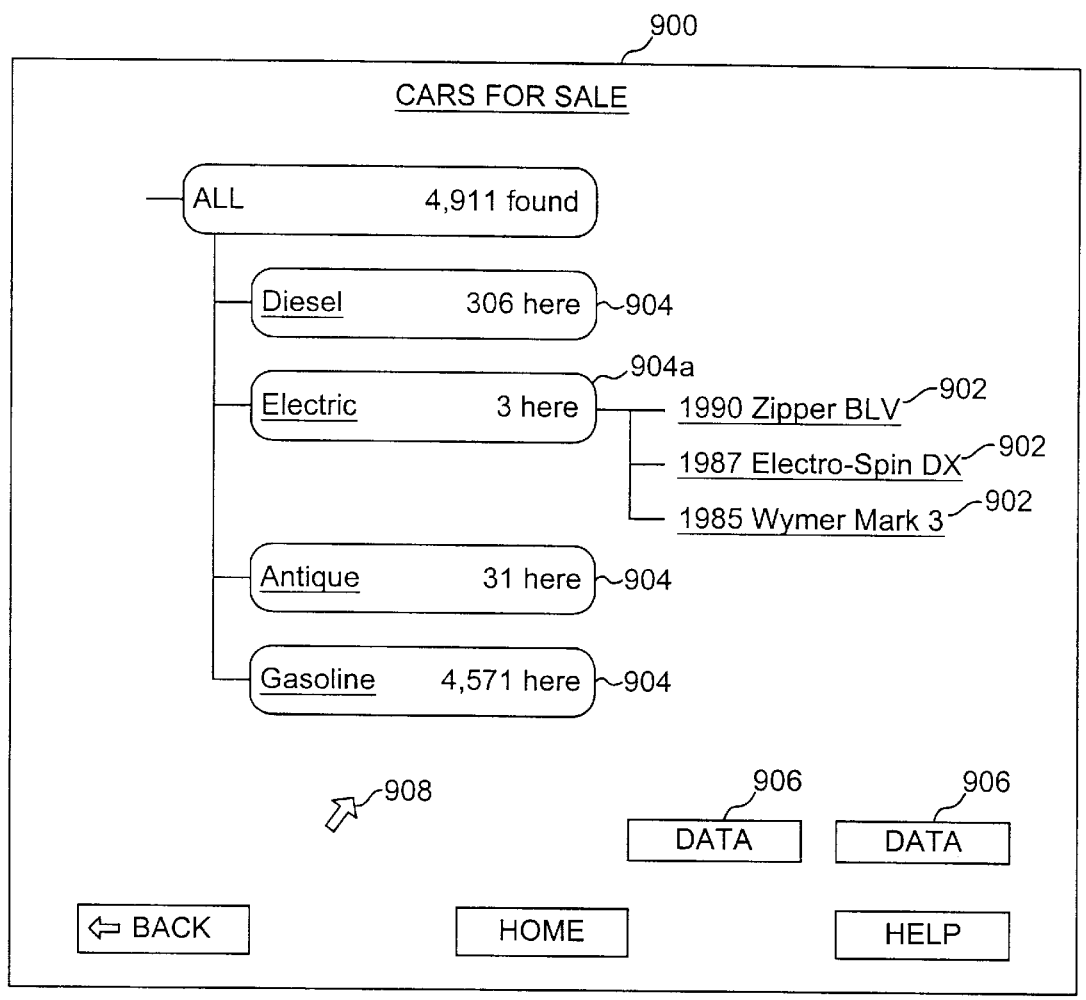
FIG. 11 is a block diagram of a display in which items are represented by item labels and category labels.

FIG. 11 illustrates the use of clustering to optimally fill a display 900. Display 900 is a display which might be used to gain insight into a database of cars available for sale. In this particular example, if all the cars for sale were shown, display 900 would list 4911 items, which cannot be shown all at once in a visible, understandable manner. As should also be apparent, since the cars are grouped into only four categories, limiting the display to only categories, only half of the available display space would be used. With the approach of the present invention, however, some of the items are shown by item labels and others are represented by category labels. In FIG. 11, three item labels 902 and four category labels 904 are shown (however, one of the category labels, 904a, does not represent any items, as all of its items are represented by item labels 902).

The labels 902, 904 which represent items or categories are underlined in the display to indicate to the user that the label can be selected to obtain information about the data which the label represents. Thus, selecting (via a "mouse click" on the item label or other methods) an item label 904 will result in a display of information about the selected item, whereas selecting a category label will result in a display of item labels for items in that category, a request for more information, a listing of items using subcategory labels, or some combination of these.

As shown in FIG. 11, the "Electric" category is opened up to show all of its items, but none of the other categories are opened. If they were, the listing would not fit into display 900, because at least 31 more lines would be used (if the next smallest category, "Antique", is opened). To automatically determine which categories to open, a processor, such as the CPU shown in FIG. 5 and described above, determines how much space is available after the display of the category labels, and then opens categories beginning with the smallest category, until there is no space left in the display to open another category. Alternatively, the processor might set a threshold count and tentatively open each category having a number of items equal to or less than the threshold count and then adjust the threshold count to shrink or expand the list to best fit the display area.

FIG. 11 also shows dynamic data fields 906. These fields are used to display information about an item or a category when a cursor 908 is moved over the item or category. If cursor 908 is over a category, data fields 906 present summary information about the items in that category, such as the average value for a field in the records for those items. If cursor 908 is over an item, data fields 906 present detailed information about the item. The detailed information can either be the specific values for the same field as used when cursor 908 is over a category or other information.

Using the category labels and item labels, a display area can be efficiently populated, while giving the user an indication of the overall organization of the data in the database.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of presenting a user with a display of a selection of items, wherein each item is characterized in the display as being a member of a category selected from a plurality of categories, the method comprising the steps of:

determining a number of categories which are to be represented in the display;

determining a number of selections which can be presented at one time in the display, a selection being either an item or a category, wherein an item can be represented by a plurality of selections if the item is in a plurality of categories; and displaying at least one item label and at least one category label, where the category label represents the items in the category, where the items and categories displayed are determined as a function of the number of categories, the number of selections and a threshold count.

2. The method of claim 1, wherein the step of displaying further comprises the steps of:

representing items from categories having no more items than the threshold count by individual item labels; and representing items from categories having more items than the threshold count collectively by a category label.

3. The method of claim 1, wherein each item is characterized in the display as being a member of a category selected from a plurality of categories, the method comprising the steps of:

determining a number of categories which are to be represented in a display;

determining a number of selections which can be presented at one time in the display, a selection being either an item or a category, wherein an item can be represented by a plurality of selections if the item is in a plurality of categories; and displaying at least one item label and at least one category label, where the category label represents the items in the category, where the items and categories displayed are determined as a function of the number of categories, the number of selections, and a threshold count, wherein items from categories having no more items than the threshold count are represented by individual item labels; and items from categories with more items than the threshold count are collectively represented by one of the at least one category labels.

4. The method of claim 1, wherein the categories further comprise a number of sub-categories.

5. The method of claim 1, further comprising the step of accepting user input selection of either an item label or a category label.

6. The method of claim 5, further comprising the step of generating a regenerated display following the selection of a label, wherein the regenerated display is a display filtered according to the selected label.

7. The method of claim 1, further comprising a step of setting the threshold count to a value which is calculated to fill the display with labels.

8. The method of claim 1, wherein an item is referenced by a record having at least one field in the record for categorizing and sub-categorizing the item.

9. The method of claim 1, wherein a category includes a cluster of records, where the record belongs to one or more cluster.

10. The method of claim 1, wherein an item is a link to a hypertext page.

11. A method of presenting a user with a display of a selection of items, wherein each item is characterized in the display as being a member of a category selected from a plurality of categories, the method comprising the steps of:

determining a number of categories which are to be represented in the display;

determining a display area;

determining how much of the display area would be left over area, if any, after display of category labels representing items;

designating at least one category as an open category; and displaying an item label for each item in the at least one open category and other open categories, if any, and a category label for each unopen category.

12. The method of claim 11, wherein the categories further comprise a number of sub-categories.

13. The method of claim 11, further comprising steps of:

when a cursor is over a category label, displaying summary information about the items in the category associated with the category label; and when the cursor is over an item label, displaying detailed information about the item associated with the item label.

14. A computer program embodied on a computer-readable medium for presenting a user with a display of a selection of items, the computer program comprising:

a code segment for determining a number of categories which are to be represented in a display;

a code segment for determining a number of selections which can be presented at one time in the display, a selection being either an item or a category, wherein an item can be represented by a plurality of selections if the item is in a plurality of categories; and a code segment for displaying at least one item label and at least one category label, where the category label represents the items in the category, where the items and categories displayed are determined as a function of the number of categories, the number of selections and a threshold count.

15. The computer program of claim 14, wherein the code segment for displaying further comprises:

a code segment for representing items from categories having no more items than the threshold count by individual item labels; and a code segment for representing items from categories having more items than the threshold count collectively by a category label.

16. The computer program of claim 14, further comprising a code segment for accepting user input selection of either an item label or a category label.

17. The computer program of claim 16, further comprising a code segment for generating a regenerated display following the selection of a label, wherein the regenerated display is a display filtered according to the selected label.

18. The computer program of claim 14, further comprising the code segment for setting the threshold count to a value which is calculated to fill the display with labels.

19. A computer program embodied on a computer-readable medium for presenting a user with a display of a selection of items, the computer program comprising:

a code segment for determining a number of categories which are to be represented in the display;

a code segment for determining a display area;

a code segment for determining how much of the display area would be left over area, if any, after display of category labels representing items;

a code segment for designating at least one category as an open category; and a code segment for displaying an item label for each item in the at least one open category and other open categories, if any, and a category label for each unopen category.

20. The computer program of claim 19, wherein the a code segment for designating at least one category as an open category further comprises a code segment for designating categories as open from the smallest category to the largest category, based on the number of items in the category, until a category is reached which will result in a display of item labels and category labels which will fill but not exceed a display area.

21. The computer program of claim 19, wherein the categories further comprise a number of sub-categories.

22. A method of presenting a user with a display of a selection of items, wherein each item is characterized in the display as being a member of a category selected from a plurality of categories, the method comprising the steps of:

determining a number of categories which are to be represented in a display;

determining a number of selections which can be presented at one time in the display, a selection being either an item or a category, wherein an item can be represented by a plurality of selections if the item is in a plurality of categories; and displaying at least one item label and at least one category label, where the category label represents the items in the category, where the items and the categories displayed are determined as a function of a relationship between the items and the categories.

23. The method of claim 22, wherein the step of displaying further comprises the step of determining the relationship between the items and the categories as a function including the number of categories, the number of selections, and a threshold count.

24. The method of claim 22, wherein the step of displaying further the steps of:

representing items from categories having no more items than the threshold count by individual item labels; and representing items from categories having more items than the threshold count collectively by a category label.

25. The method of claim 22, further comprising the step of accepting user input selection of either an item label or a category label.

26. The method of claim 25, further comprising the step of generating a regenerated display following the selection of a label, wherein the regenerated display is a display filtered according to the selected label.

27. The method of claim 22, further comprising a step of setting the threshold count to a value which is calculated to fill the display with labels.

* * * * *

(12) EX PARTE REEXAMINATION CERTIFICATE (6415th)
United States Patent
Sklar

(10) Number: US 6,243,094 C1
(45) Certificate Issued: *Sep. 2, 2008

(54) CLUSTERING USER INTERFACE

(75) Inventor: Peter Sklar, Santa Barbara, CA (US)

(73) Assignee: U.S. Vantage Company L.L.C., Phoenix, AZ (US)

Reexamination Request:
No. 90/008,915, Nov. 13, 2007

Reexamination Certificate for:
Patent No.: 6,243,094
Issued: Jun. 5, 2001
Appl. No.: 09/416,172
Filed: Oct. 11, 1999

(*) Notice: This patent is subject to a terminal disclaimer.

Related U.S. Application Data

(63) Continuation of application No. 08/861,365, filed on May 21, 1997, now Pat. No. 6,025,843, which is a continuation-in-part of application No. 08/711,300, filed on Sep. 6, 1996, now Pat. No. 5,790,121.

(51) Int. Cl.
G06F 17/30 (2006.01)

(52) U.S. Cl. .................. 715/853; 715/810; 715/866
(58) Field of Classification Search .................. None
See application file for complete search history.

(56) References Cited

U.S. PATENT DOCUMENTS 5,950,168 A  9/1999  Simborg et al.
6,112,201 A  8/2000  Wical

OTHER PUBLICATIONS de Baar, Foley, and Mullet, "Coupling Application Design and User Interface Design," Proc. of the 1992 SIGCHI Conference on Human Factors in Computing Systems, CHI '92, pp. 259–266, ACM (1992).
Gray, de Baar, Foley, and Mullet, "Coupling Application Design and User Interface Design," ACM SIGGRAPH Video Review, Issue 76, Technical Video Program of the 1992 SIGCHI Conference on Human Factors in Computer Systems, title page and table of contents (5 pages) and video (6 minutes, 8 seconds), also available at http://www.ibiblio.org/openvideo/video/chi/chi92one_07_m1.mpg, http://www.ibiblio.org/openvideo/video/chi/chi92one_07_m2.mpg, and http://www.ibiblio.org/openvideo/video/chi/chi92one_07_m4.mpg (1992).
Michael E. Lesk, "What to Do When There's Too Much Information," Proc. Hypertext '89, pp. 305–318, ACM Press (1989).
Anonymous, LC classification outline, fourth edition, Library of Congress, Washington, 40 pages, 1978.
Web page archive dated Apr. 25, 1998, from www.archive.org depicting content of www.coolmaps.com, including a demo of the Data Drill technology, and the HTML code associated with chosen images, 96 pages.
Turo and Johnson, "Improving the Visualization of Hierarchies with Treemaps: Design Issues and Experimentation," Proc. Visualization '92, Boston, MA, Oct. 19–23, 1992, pp. 124–131 (1992).
Johnson, "TreeViz: File Directory Browsing," information about distibution (7 pages) and video ( 4 minutes, 32 seconds), also available at http://www.cs.umd.edu/hcil/pubs/video93.shtml (1993).
Witten, Cleary, and Greenberg, "On Frequency–based Menu–splitting Algorithms," Int. J. Man–Machine Studies, 21, pp. 135–148 (1984).

Primary Examiner—Deandra M Hughes

(57) ABSTRACT

A user is presented with a display of item labels and category labels, where item labels are shown to the extent that categories contain not more than a threshold count of items. Alternatively, the item labels are shown to the extent that display area is left over after the display of category labels, and the categories for which item labels are shown are selected from the smallest categories to the largest.

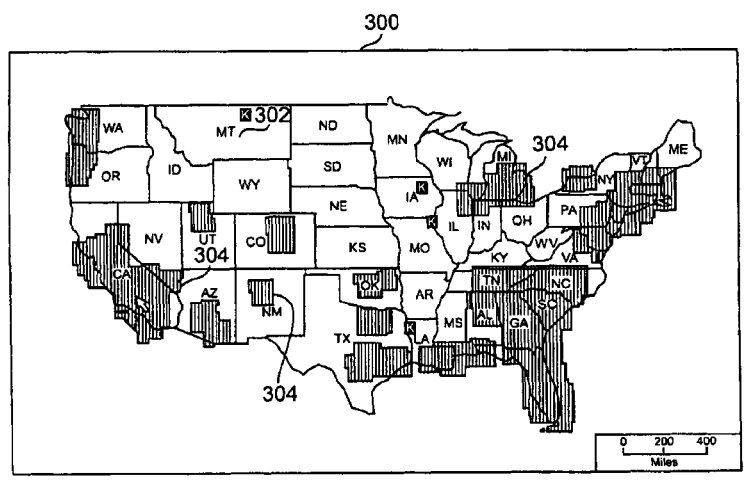

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–27 is confirmed.

* * * * *